United States Patent [19]
Daniel et al.

[11] Patent Number: 5,825,681
[45] Date of Patent: Oct. 20, 1998

[54] DIVIDER/MULTIPLIER CIRCUIT HAVING HIGH PRECISION MODE

[75] Inventors: Andrew D. Daniel, San Jose; Thomas Alexander, Santa Clara, both of Calif.

[73] Assignee: Alliance Semiconductor Corporation, San Jose, Calif.

[21] Appl. No.: 590,656

[22] Filed: Jan. 24, 1996

[51] Int. Cl.$^6$ .................................................. G06F 7/52
[52] U.S. Cl. ................................................. 364/765
[58] Field of Search ................................... 364/764–765, 364/748

[56] References Cited

U.S. PATENT DOCUMENTS

| | | | |
|---|---|---|---|
| 3,633,018 | 1/1972 | Ling | 364/765 |
| 4,025,773 | 5/1977 | Bennett | 235/164 |
| 4,272,827 | 6/1981 | Inui et al. | 364/765 |
| 4,380,051 | 4/1983 | Fette | 364/766 |
| 4,688,186 | 8/1987 | Ferrell et al. | 364/764 |
| 4,724,529 | 2/1988 | Irukulla et al. | 364/761 |
| 4,760,550 | 7/1988 | Katzman et al. | 364/748 |
| 4,996,660 | 2/1991 | Beacom et al. | 364/761 |
| 5,140,545 | 8/1992 | Vassiliadis et al. | 364/765 |
| 5,339,267 | 8/1994 | Ito | 364/761 |

*Primary Examiner*—Tan V. Mai
*Attorney, Agent, or Firm*—Bradley T. Sako

[57] ABSTRACT

A divider/multiplier circuit (10) is disclosed. In a divider mode, numerator terms are coupled to a normalizer (14) which generates normalized numerator values and corresponding numerator exponent values therefrom. Denominator terms are coupled to a look-up normalizer (20) which generates normalized denominator inverse values and corresponding denominator exponent values therefrom. The numerator and denominator exponent values are summed in an adder circuit (18) to generate a sum exponent value. The normalized numerator and inverse denominator values are multiplied in a multiplier circuit (16) to generate a normalized quotient value. The normalized quotient value is denormalized according to the sum exponent value. In a multiply mode of operation first and second multiplicands are coupled to the multiplier circuit (16). In a high precision divide mode, a sequence of numerator and inverse denominator values are coupled to the multiplier circuit (16) to generate a sequence of partial product terms. The partial product terms are accumulated in a high precision loop (24) to provide a high precision division value. Negative multiplicands and numerator values are handled by a leading absolute value generator (12) which generates the absolute value of the multiplicand or numerator value. A trailing signed value generator (22) additively inverts the product or quotient if the multiplicand or numerator value was negative.

20 Claims, 5 Drawing Sheets

DIVIDER/MULTIPLIER CIRCUIT HAVING HIGH PRECISION MODE

TECHNICAL FIELD

The present invention relates generally to circuits for performing arithmetic operations on binary numbers, and more particularly to circuits for performing either division or multiplication of binary numbers.

BACKGROUND OF THE INVENTION

Many computer system applications, such as the rendering of three-dimensional modeled images, can push the computing limits of the host microprocessor. To reduce the amount of host resources necessary for such applications, some operations are off-loaded from the host microprocessor to additional, specialized system hardware.

One particularly costly operation is division. While some division operations can be performed rapidly, such as division by powers of two (with a shift operation), other divisors require specialized algorithms and/or circuitry.

U.S. Pat. No. 4,025,773 issued to Walter Scott Bennett on May 24, 1977 discloses a modular apparatus for performing a division operation. Successive shift and add operations are performed on a divisor value to approximate a multiplication of the divisor value by a quotient. The same operations are simultaneously performed on a dividend value to effectively multiply the dividend by the reciprocal of the divisor. While providing a versatile arrangement, a drawback of Bennett is the large number of iterations required to arrive at a quotient.

U.S. Pat. No. 4,380,051 issued to Bruce A. Fette on Apr. 12, 1983 discloses a digital divider having normalization circuits. The denominator value is normalized by shifting the denominator value so that the denominator is loaded into a register starting with a first significant bit. The division operation is accomplished by subtractions of the denominator from the numerator and resulting remainders.

U.S. Pat. No. 4,760,550 issued to Katzman et al. on Jul. 26, 1988 discloses a system for dividing an address by a constant number. ROMs are provided to receive an input value and generate a quotient and remainder value. Iterative passes are made to the tables to generate final quotient value.

A drawback of both Fette and Katzman et al. is that they both approach the division operation by successive subtractions of the divisor from the numerator. This type of approach can require multiple iterations as well as the manipulation of the remainder.

U.S. Pat. No. 5,339,267 issued to Eiki Ito on Aug. 16, 1994 discloses a preprocessor of a division device having multiple zero count and shift circuits for normalizing divisor and dividend values. Following the preprocessing, division is left to a main processor.

SUMMARY OF THE INVENTION

It is an object of the present invention to provide a divider circuit of increased speed.

It is another object of the present invention to provide a divider circuit having a high precision mode.

It is another object of the present invention to provide a divider circuit that can also function as a multiplier circuit.

It is another object of the present invention to provide a divider circuit that generates a quotient value having the least error in calculations with minimum hardware.

According to the preferred embodiment of the present invention, a divider/multiplier circuit includes a divide mode and a multiply mode. In the divide mode, a numerator value is normalized to create a normalized numerator value, and a numerator exponent value. A denominator value is received by look-up logic which generates normalized denominator inverse value, and an accompanying denominator inverse exponent value. The normalized numerator and denominator inverse values are applied to a multiplier circuit to generate a normalized quotient value. At the same time, the exponent values are added in an adder circuit to generate a quotient exponent value, which is used to shift the normalized quotient value to arrive at the final quotient value.

In a multiply mode, a first multiplicand follows the same path as the numerator in the divide mode, resulting in a normalized first multiplicand being applied to the multiplier circuit, and a first multiplicand exponent value being applied to the adder. A second multiplicand bypasses the look-up logic and is applied directly to the multiplier circuit. The multiplier circuit generates a normalized product value which is then shifted by the first multiplicand exponent value.

According to another aspect of the present invention, a divider circuit is provided having a high precision mode wherein a division operation is subdivided into a series of smaller operations, each operating on a portion of a numerator and a portion of an inverse denominator, with a multiplier circuit outputting a sequence of partial product terms.

According to one aspect of the present invention, a high precision divide mode is provided where a sequence of the numerator values and corresponding exponent values are coupled to the multiplier and adder, respectively. The values of the sequence each represent a portion of a larger numerator value. Similarly, a sequence of normalized inverse denominator values and corresponding exponent values are generated by the look-up logic, and coupled to the multiplier and adder. In a similar fashion to the numerator sequence, this sequence is composed of values representative of a larger denominator value. The sequence of numerator and denominator values result in the multiplier circuit outputting a sequence of partial product terms. These values are added, and shifted if necessary, to create a high precision quotient value.

According to another aspect of the present invention, in the divide mode, numerator values are received with a sign indication. Absolute numerator values are generated prior to being normalized, resulting in an absolute normalized quotient value. According to the sign indication of the original numerator value, the absolute normalized quotient value is shifted and given appropriate sign notation. An advantage of the present invention is that it provides a circuit for performing either a fast divide, a fast multiply, or a high precision divide operation.

Other objects and advantages of the present invention will become apparent in light of the following description thereof.

DETAILED DESCRIPTION OF THE EMBODIMENTS

Figure 1:
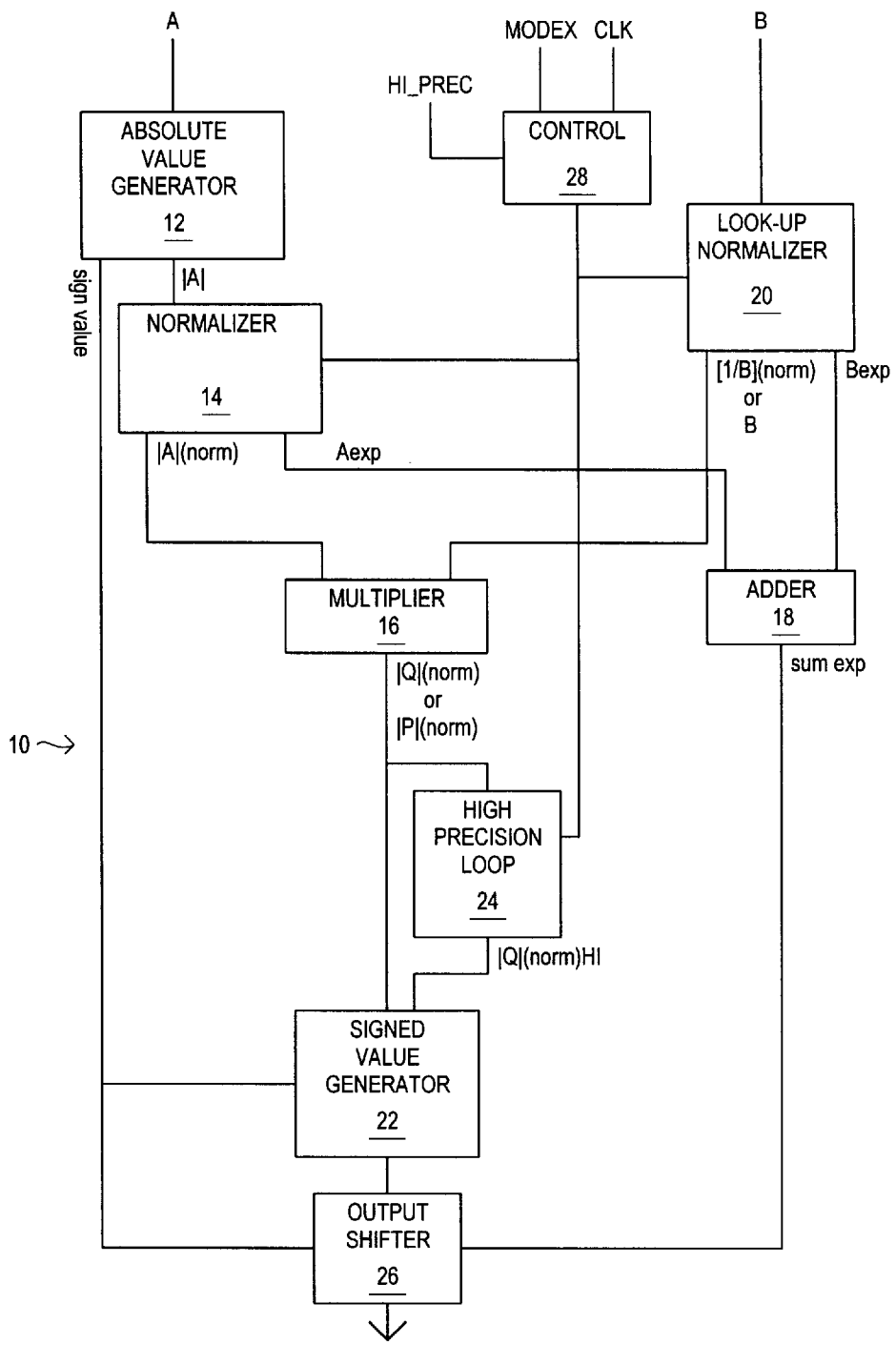
FIG. 1 is a block diagram illustrating a divider/multiplier circuit according to the present invention.

FIG. 1 sets forth, generally, a divider/multiplier circuit according to a preferred embodiment of the present invention. The circuit is designated by the general reference character 10, and receives two values, shown as A and B. The mode of operation of the circuit (i.e., multiplication or division of A and B) is determined according to an externally provided MODEX signal. In addition, the divider/multiplier circuit has a high precision division mode of operation triggered by a high precision mode signal (HI_PREC). The high precision mode of operation will be discussed at a later point herein.

In the low precision divider mode of operation, A is a numerator value and B is a denominator value. In a preferred embodiment, A is received in a signed format, such as two's complement. An absolute value generator 12 converts the signed value into an absolute numerator value (shown as |A|) while retaining the sign information in a sign bit. The value |A| is then normalized in a normalizer 14 to generate a normalized absolute numerator value |A|(norm) and a numerator exponent value (Aexp). |A|(norm) is coupled to the input of multiplier circuit 16 and Aexp is coupled to an adder circuit 18.

The denominator value B, is received by a look-up normalizer 20. In the low precision divider mode, the value B is coupled to look-up logic which generates a normalized inverse denominator value (shown as [1/B] (norm)) and a corresponding inverse exponent value (shown as Bexp). [1/B](norm) is coupled to the multiplier circuit 16 while Bexp is coupled to the adder circuit 18.

Division is accomplished by multiplying the numerator by the inverse of the denominator. As set forth in FIG. 1, the multiplier circuit 16 receives |A|(norm) and [1/B] (norm) to produce a normalized quotient value |Q|(norm). In the preferred embodiment this value is unsigned, and so is illustrated in FIG. 1 as |Q|(norm). The output of the multiplier is coupled to a signed value generator 22, either directly, or indirectly via a high precision loop 24. The high precision loop 24 will be discussed below. The sign value generator 22 receives the unsigned normalized quotient value, and according to the sign value bit, converts it into a signed format (shown as Q(norm)).

The adder circuit 18 adds the numerator exponent and inverse denominator exponent values to generate an exponent sum value (sum exp). Q(norm) is then "denormalized" by being shifted by output shifter 26 according to the exponent sum value and the sign bit.

The multiply mode of operation will now be described. Referring now to FIG. 1, in the multiply mode of operation, the first multiplicand, A, is processed in the same manner as the numerator value. As a result, a first absolute normalized multiplicand value is coupled to the multiplier circuit 16 and a first multiplicand exponent value is coupled to the adder circuit 18. Unlike the low precision divide operation, in the multiply operation, the look-up normalizer 20 does not generate an inverse value, and instead produces a second multiplicand value (B) and an accompanying second multiplicand exponent value (Bexp). The value of Bexp, in the preferred embodiment is always zero. These values are coupled to the multiplier circuit 16 and the adder circuit 18, respectively. As will described in more detail herein, in the preferred embodiment, the look-up operation of the value B is bypassed, and B is coupled directly to the multiplier circuit 16. The corresponding second multiplicand exponent value is set to zero (Bexp=0).

The first absolute multiplicand value (A) and the second multiplicand value (B) are multiplied in the multiplier circuit 16 to generate a normalized absolute product value (|P| (norm)). The exponent values are summed to generate the sum exp value, which, in the preferred embodiment, is the same as Aexp. The remainder of the multiply operation proceeds in the same manner as the low precision divide operation set forth above.

The high precision divide mode of operation will now be described. Referring once again to FIG. 1, in the high precision divide mode the HI_PREC signal is active, and the normalizer 14 generates a sequence of normalized numerator values. The sequence includes values that are each representative of a portion of a larger numerator value. As just one example, the large numerator value could be the sixteen bit number

1001110010011001 which could be represented by a sequence that includes the two segments 10011100 and 10011001, where the first segment is the first eight bits and the second segment is the last eight bits.

Similarly, the look-up normalizer 14 generates a sequence of normalized inverse denominator values composed of terms that each represent a portion of a high precision normalized inverse denominator value. As just one example, the value could be

.1111001010001000 and represented by a sequence that includes the two values 11110010 and 10001000.

It is important to note that the sequence of numerator and denominator values are arranged so as to couple all possible different combinations of numerator and inverse denominator values to the multiplier circuit 16. As a result, the multiplier circuit 16 outputs a series of absolute partial product terms. In the preferred embodiment, the partial product terms are provided in a least-significant to most-significant order.

The partial product terms are sequentially coupled to the high precision loop 24. The high precision loop 24 shifts each partial product term according to the portions of the higher precision values that the terms represent. The partial product terms are accumulated to arrive at a high precision absolute normalized quotient value (|Q|(norm) HI). This value is given an appropriate signed format, and "denormalized" in the manner previously described.

The circuit 10 is switched between the low and high precision modes according to a control circuit 28. A more detailed description of the operation of a control circuit 28, according to a preferred embodiment, is set forth at a later point herein.

Figure 2A:
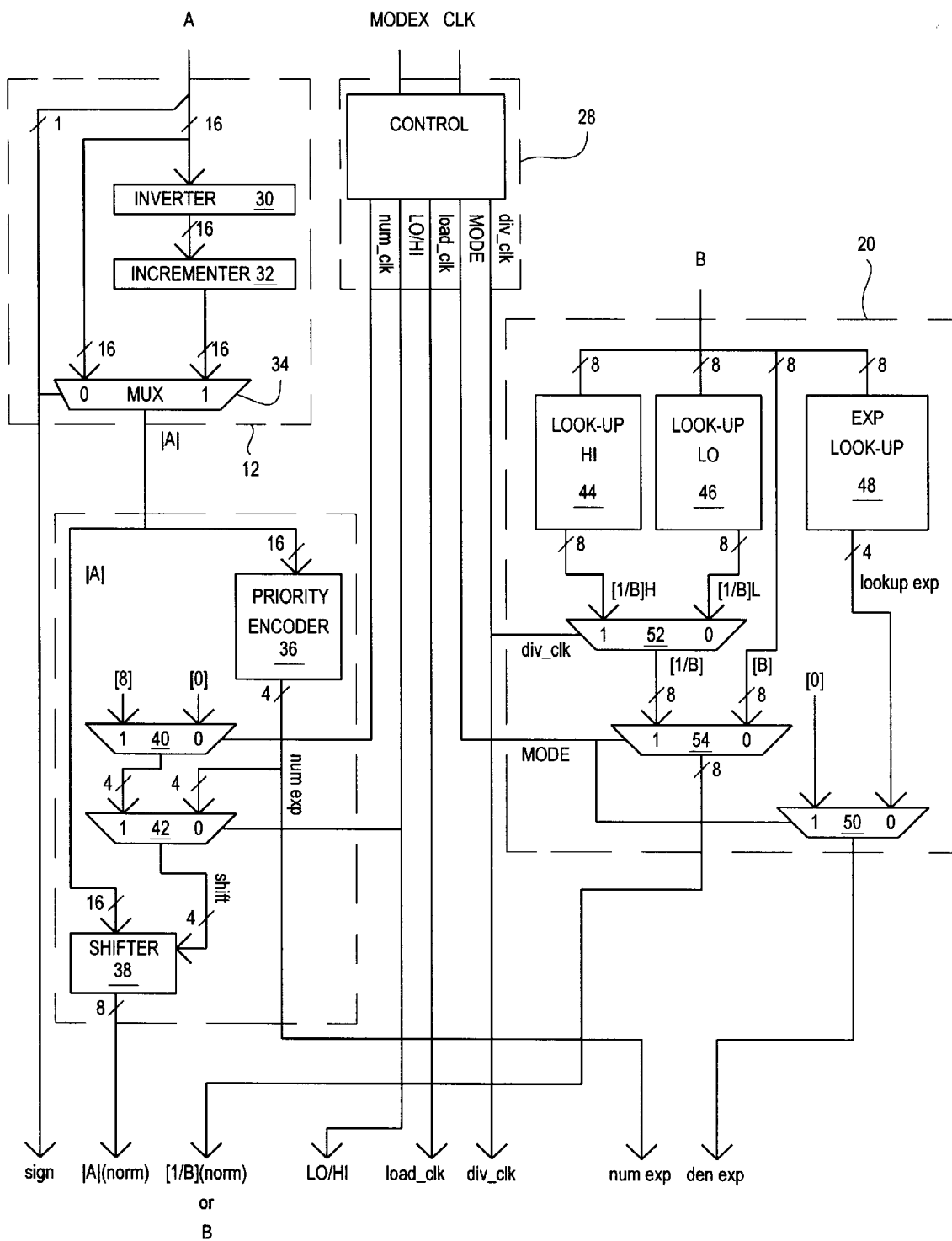
FIGS. 2a and 2b are a block schematic diagram illustrating a preferred embodiment of the present invention.
Figure 2B:
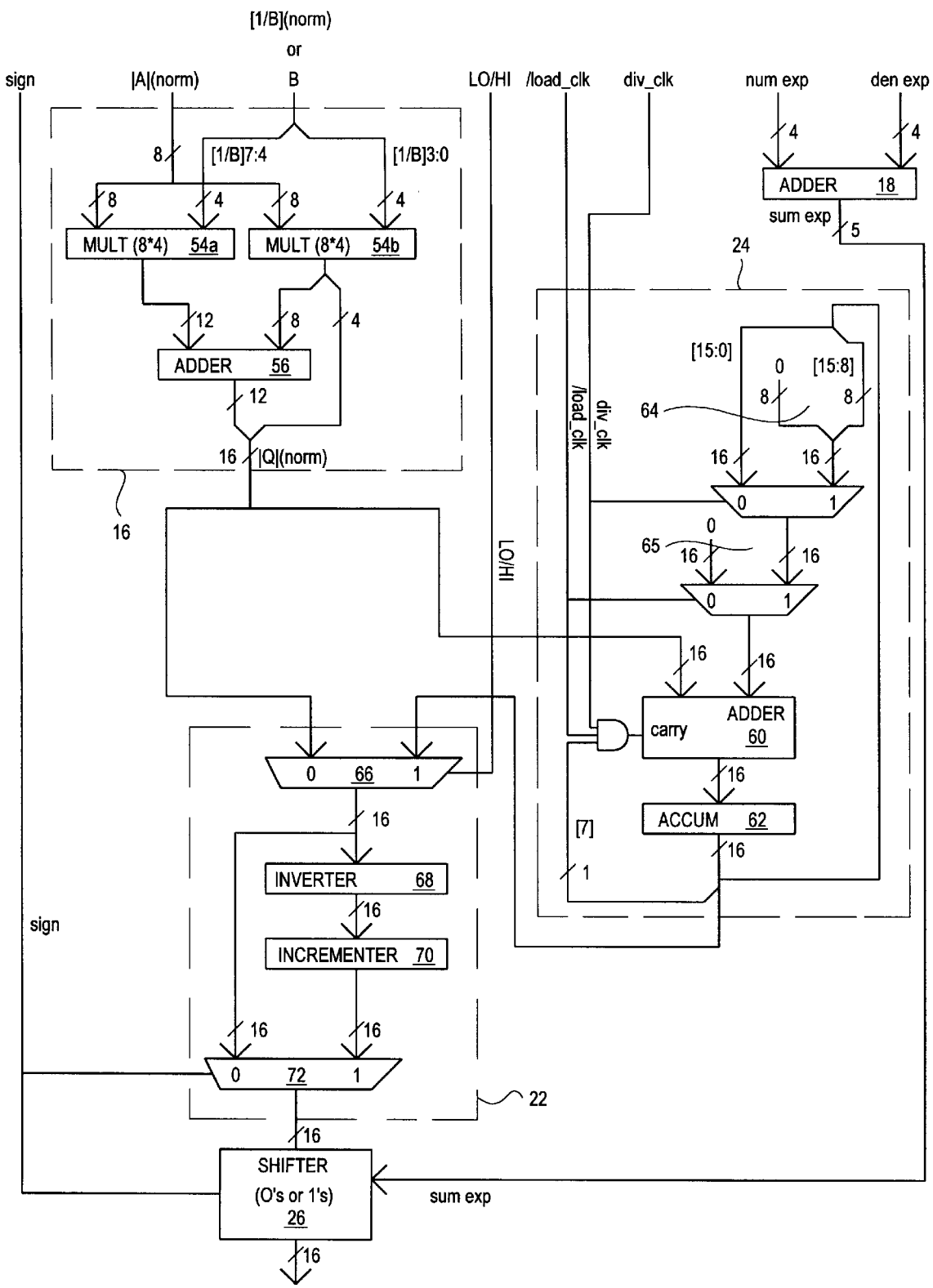
Figure 3:
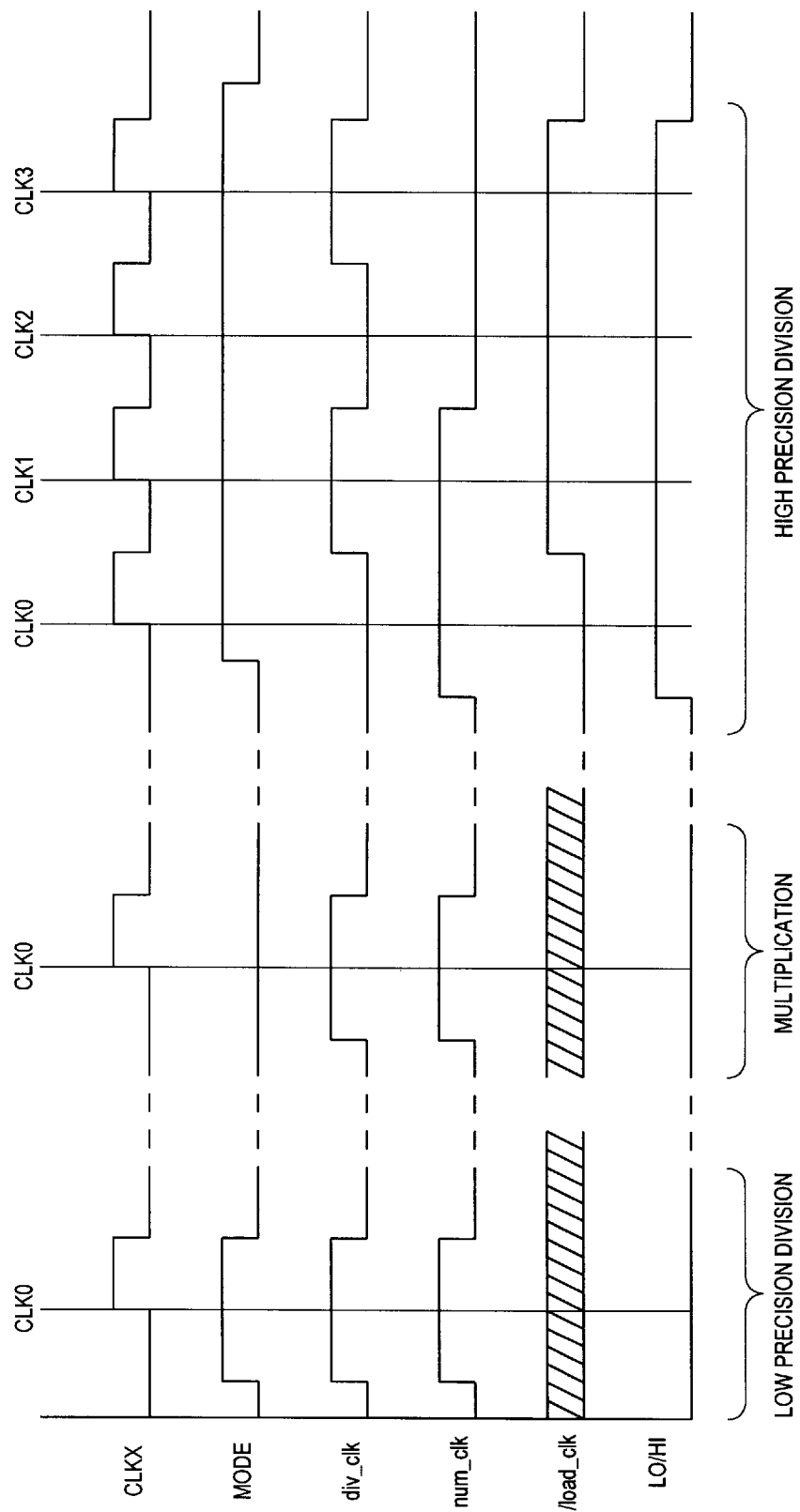
FIG. 3 is a timing diagram illustrating the control signals of the embodiment set forth in FIGS. 2a and 2b.

Reference is now made to FIGS. 2a, 2b and 3. FIGS. 2a and 2b are block schematic diagram illustrating the divider/multiplier circuit of the preferred embodiment. FIG. 3 is a timing diagram illustrating the various control signals of the circuit set forth in FIGS. 2a and 2b.

Referring now to FIG. 2a, the absolute value generator 12 is shown to include an inverter 30, an incrementer 32, and a multiplexer (MUX) 34. A two's complement, 16-bit input value (A) is received by the absolute value generator 12. The sign bit is the high order bit of the value. The sixteen bits are coupled directly to one input of the MUX 34, and indirectly to the other input by way of the inverter 30 and the incrementer 32. The inverter 30 inverts the bit values and the incrementer 32 increments the result by one. These last two operations convert a negative two's complement value to its additive inverse. If the sign bit value is 0, indicating a positive number, the MUX 34 couples the original 16-bit value of A to its output. If the sign bit is 1, indicating a negative value, the additive inverse value is coupled to the MUX 34 output. The MUX 34 output is referred to as an absolute value, and is shown in FIG. 2a as "|A|".

The absolute value |A| is then applied to the normalizer 14 where it is received by a priority encoder 36 and a shift circuit 38. The priority encoder 36 of the preferred embodiment generates a numerator exponent value (num exp) according to the number of non-count digits in the |A| value. Non-count digits are those digits having no significant values. For example, leading zeros in positive two's complement values or leading one's in negative two's complement values. Because |A| is an absolute value in the preferred embodiment, leading zeros are counted by the priority encoder 36. The shift circuit 38 shifts and truncates the sixteen bit value of |A| to generate an eight bit normalized value |A| (norm). The amount of shifting done by the circuit is determined according to a shift input (shown as "shift"). The precision mode MUX 42 is controlled by a LO/HI signal, and receives the num exp value from the priority encoder 36 at one input, and a constant value (either 8 or 0) from the numerator byte MUX 40.

Referring now to FIG. 3 in conjunction with FIG. 2a, it is shown that during low precision division the LO/HI signal is low. As a result, the num exp value is coupled to the shift circuit 38, generating an 8-bit normalized value. The normalizer circuit 14 functions in the same manner in the multiply mode. In the high precision division mode, however, the precision mode MUX 42 inputs values provided by the numerator byte MUX 40. The numerator byte MUX 40 is controlled by num_clk, and as set forth in FIG. 3, the num_clk signal is high for two clocks, then low for two clocks. Accordingly, shift values of 8, 8, 0 and 0 are sequentially coupled to the shift circuit 38. This results in the lower order byte of the numerator value being output by the shift circuit 38 during the first two clocks, and the high order byte during the last two clocks.

Referring once again to FIG. 2a, the look-up normalizer 20 is set forth in detail. The normalizer receives the eight bit value B, which is a denominator value in the divide modes, and a multiplicand in the multiply mode. The value B is coupled to a look-up hi circuit 44, a look-up lo circuit 46, and an exponent look-up circuit 48. In response to the value of B, the look-up hi circuit 44 generates the high order eight bits of the normalized inverse value ([1/B]H). That is, the equivalent to 1/B to eight binary places, starting with the first significant bit. In a similar fashion, the look-up lo circuit 46 generates the low order eight bits of the 1/B value ([1/B]L) . That is, the equivalent of eight binary places beyond the corresponding normalized high order value. Thus, the high order and low order inverse values are concatenated together to form a sixteen bit, high precision, normalized inverse value.

The exponent look-up circuit 48 receives the eight bit value B and outputs the exponent corresponding to the normalized inverse value (shown as lookup exp) . In the divide modes of operation, this value is output by an exponent MUX 50 by the operation of the MODE signal to provide a denominator exponent value (den exp). In the multiply mode, this value is set to zero.

The low and high order inverse values are provided as inputs to a denominator byte MUX 52. The output of the denominator byte MUX 52 is coupled to an operation mode MUX 54. The other input of the operation mode MUX 54 receives the eight bit value of B directly (i.e., not a reciprocal value).

Figure 4:
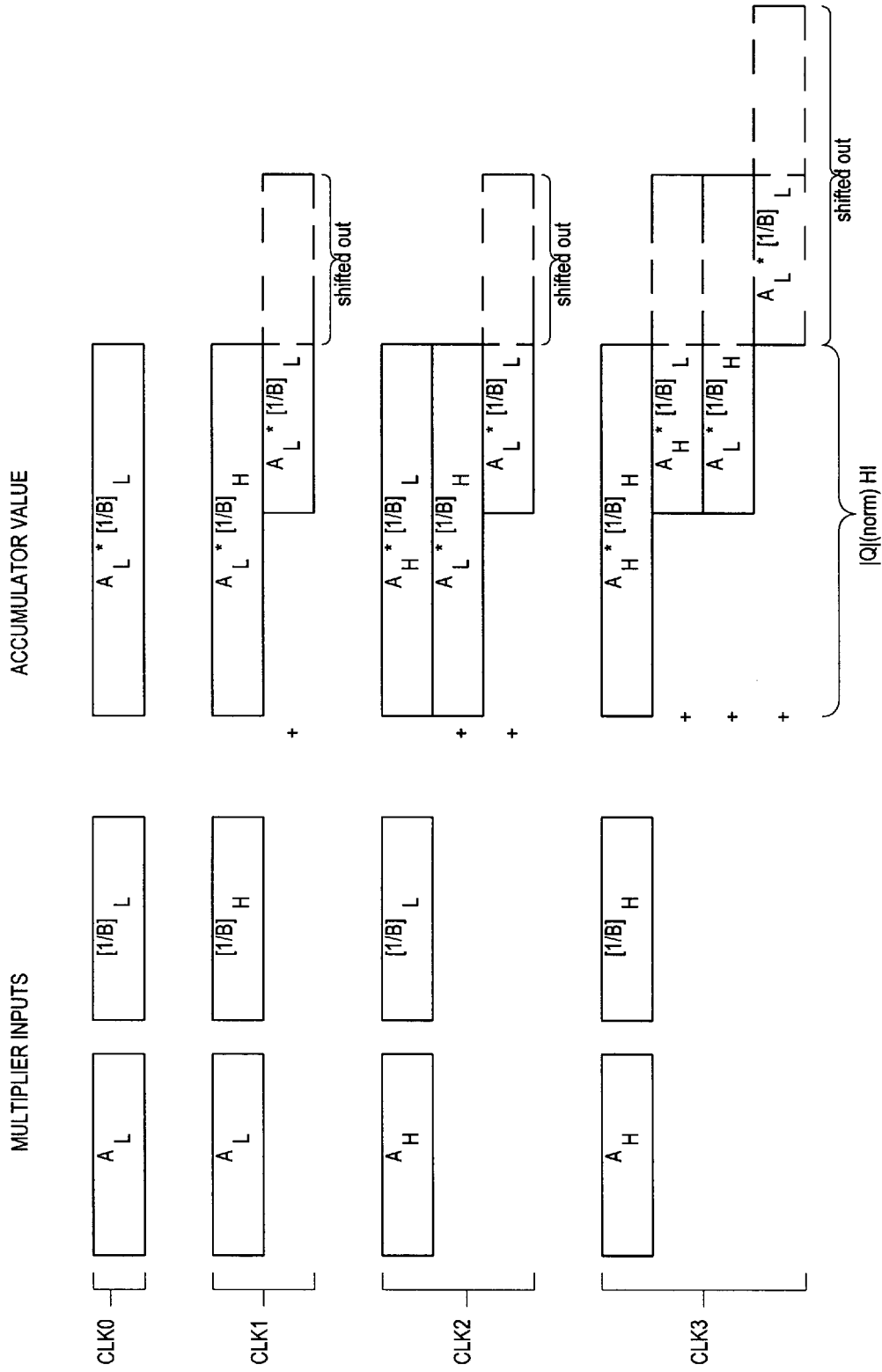
FIG. 4 is a diagram illustrating the shift and accumulate operation of the high precision loop of a preferred embodiment.

As set forth in FIG. 2a, the denominator byte MUX 52 is controlled by the div_clk signal while the operation mode MUX 54 is controlled by the MODE signal. Referring now to FIG. 3 in conjunction with FIG. 2a it is shown that in the low precision division mode, MODE is high and div_clk is high. In response to this set of control signals, the high order inverse value is coupled to the output of MUX 54. In the multiplication mode, the MODE signal is low, and so the eight bit (noninverted) value B is coupled to the output of MUX 54. In the high precision division mode, the MODE signal is high, and div_clk is low on a first clock, high on a second clock, low on a third clock, and then high again on a fourth clock. As a result, four bytes are sequentially output from the denominator byte MUX 52 and then from the operation mode MUX 54; the low byte, the high byte, the low byte again, and then the high byte again. This sequence, in conjunction with the numerator byte sequence described above, creates the proper numerator/denominator byte pairs necessary to generate the correct partial product terms. FIG. 4 sets forth the values applied to the multiplier circuit 16 during each cycle of the high precision division operation.

Referring now to FIG. 2b, the multiplier circuit 16 of a preferred embodiment is shown to include two eight-by-four binary multipliers (54a and 54b) and a twelve bit adder 56. The normalized numerator value |A|(norm) is coupled to the eight bit inputs of both multipliers 54a and 54b. The normalized inverse value [1/B] (or second multiplicand, B, in the case of the multiply mode) is split between the two multipliers (54a and 54b) with one multiplier 54a receiving the four most significant bits (shown as [1/B]7:4) and the other multiplier 54b receiving the remaining four bits (shown as [1/B]3:0). The results are properly summed/combined in the adder 56 to generate a sixteen bit normalized quotient value (|Q|(norm)).

As described above, the exponent values num exp and den exp are added in adder 18 to generate an exponent sum, sum exp.

The high precision loop 24 of a preferred embodiment is set forth in FIG. 2b, and includes a sixteen bit adder 60, a sixteen bit accumulator 62, a loop shift circuit 64, and a load circuit 65. The adder 60 receives one input from the multiplier circuit 16 and another from the load circuit 65. In the preferred embodiment, the adder 60 also includes a carry-in input. The output of the adder 60 is applied to the accumulator 62. The accumulator 62, in turn, outputs its accumulated value to both a LO/HI MUX 66 and the input of the loop shift circuit 64.

The loop shift circuit 64 shifts its sixteen bit input value by 8 or zero according to the div_clk signal. As a result, the loop shift circuit 64 shifts its value by 8, 0, 8, and 0 bits during the four clocks of the precision division mode. The load circuit 65 loads the value from the loop shift circuit 64 or the value zero according to the signal load_clk.

The operation of the loop shift circuit 64 and the load circuit 65 in conjunction with the accumulator 62 is best described in conjunction with FIG. 4. On the first clock, the first partial product term is added to zero by the low load_clk signal, and the resulting value stored in the accumulator (shown as [A]L*[1/B]L). This value is fed back to the loop shift circuit 64 where it is shifted right by eight bits (i.e. truncated) in response to a high div_clk signal. The truncated value is then applied as one input to the adder 60 by operation of the load circuit 65 in response to a high load_clk signal. The truncated [A]L*[1/B]L value is then added to the next partial product term ([A]L*[1/B]H) in adder 60. In the preferred embodiment, the sum is rounded up by the operation of AND gate G1 coupled to the carry-in input of adder 60. This value is stored in accumulator 62 and also coupled back to the loop shift circuit 64. The value, without shift, is added to the third partial product term ([A]H* [1/B]L). The resulting term is coupled back to the adder 60 by another right shift operation (with round up), and then added to the final partial product term to calculate the high precision, normalized quotient value.

The LO/HI MUX 66 receives a low precision normalized numerator/product value directly from the multiplier circuit 16, and a high precision normalized quotient from the high precision loop 24. If the HI/LO signal is high, the high precision value is coupled to the signed value generator 22. Conversely, if HI/LO is low, the low precision value is output.

The signed value generator 22 according to a preferred embodiment, includes the same general components as the absolute value generator 12. An inverter 68 and incrementer 70 are provided to generate the additive inverse of a two's complement value. According to the sign bit value, either the two's complement value or its additive inverse is output from an output MUX 72.

The output MUX 72 value is then "denormalized", according to the sum exp value and the sign bit, by shifter 26. The denormalization is accomplished by shifting the value received to the right, according to the sum exp value. The sign bit value is used to assure that leading one's are provided for a negative value, and leading zero's for a positive value.

While the preferred embodiment sets forth a divider/multiplier circuit for operating on two binary values, one skilled in the art would realize that multiple values could be operated on using parallel or iterative equivalent variations of the present invention. Along these same lines, variations on the present invention could operate on larger or smaller input values, and/or use larger or smaller partial product terms, or a larger or smaller number of partial product terms.

It is also noted, that while the preferred embodiment is an integral portion of a graphics accelerator integrated circuit, portions of the present invention could be realized in software and/or firmware.

Accordingly, it is understood that the invention has been described in connection with its preferred embodiments, and may be changed, and other embodiments derived, without departing from the spirit and scope of the invention. The invention is intended to be limited only by the appended claims.

What we claim is:

1. A divider circuit for receiving a numerator value and a denominator value and generating therefrom a quotient value, comprising:
   a first normalizing circuit for receiving the numerator value and generating a normalized numerator value and a numerator exponent value;
   an inverse generating circuit for receiving the denominator value and generating a normalized denominator inverse value and a denominator exponent value;
   a multiplier circuit for multiplying the normalized numerator value by the normalized denominator inverse value to generate a multiplier output value;
   a first adder circuit for adding the numerator exponent value and the denominator exponent value to generate a quotient exponent value;
   a denormalizing circuit for receiving the multiplier output value and modifying it by the quotient exponent value to generate the quotient value.

2. The divider circuit of claim 1, wherein:
   said first normalizing circuit includes
      a priority encoder for receiving the numerator value and generating a first shift value according to the number of leading, consecutive, non-count digits in the numerator value, the first shift value being the numerator exponent value, and
      a first shift circuit responsive to the priority encoder for shifting the numerator by the first shift value.

3. The divider circuit of claim 1, including:
   a first absolute value circuit for receiving a numerator value having a signed component and generating therefrom an absolute numerator value;
   the quotient value generated by said multiplier circuit is an absolute quotient value; and
   a signed value generator circuit for receiving the absolute quotient value and the signed component of at least the numerator value and generating therefrom a signed quotient value.

4. The divider circuit of claim 3, wherein:
   the first value is a two's complement value; and
   said first absolute value circuit includes
      a multiplexer (MUX) responsive to the sign bit and having a first and second MUX input, and
      a first path coupling the numerator value to the first MUX input, and a second path for coupling the numerator value to the second MUX input, the second path including an inverter circuit and an incrementer circuit.

5. The divider circuit of claim 3, wherein:
   said a signed value generator circuit includes
      a multiplexer (MUX) responsive to the sign bit and having a first and second MUX input, and
      a first path coupling the numerator value to the first MUX input, and a second path for coupling the numerator value to the second MUX input, the second path including an inverter circuit and an incrementer circuit; and
   the signed quotient value is a two's complement value.

6. The divider circuit of claim 1, wherein:
   said inverse generating circuit includes
   a look-up circuit for receiving the denominator and providing the normalized inverse denominator value thereof, and
   a look-up exponent encoder for receiving the denominator value, and generating a second shift value therefrom, the second shift value corresponding to the normalization of the denominator value and being the denominator exponent value.

7. The divider circuit of claim 1, including:
   a high precision circuit coupled to said multiplier circuit including
      a second adder for receiving the multiplier output and an adder and accumulator register output and generating a second adder output value,
      a shift circuit for shifting the second adder output value to generate a shift output value,
      an adder and accumulator register for receiving successive shift output values to generate the adder and accumulator register output.

8. The divider circuit of claim 7, wherein:
   said first normalizing circuit receives a plurality of successive numerator values to generate a plurality of successive normalized numerator values, each numerator value being a portion of a larger numerator;

said inverse generating circuit provides at least one normalized denominator inverse value for each successive numerator value;

said multiplier circuit generates successive outputs representing the partial product terms of the numerator and denominator values; and the shift circuit shifts the second adder output value according to the position of the numerator values in the larger numerator.

9. The divider circuit of claim 7, wherein:

said inverse generating circuit provides a plurality of successive normalized denominator inverse values, each normalized denominator inverse value being a portion of a larger inverse denominator; and said first normalizing circuit generates at least one numerator value for each successive inverse denominator value;

said multiplier circuit generates successive outputs representing the partial product terms of the numerator and denominator values; and the shift circuit shifts the second adder output value according to the position of the inverse denominator values in the larger inverse denominator.

10. The divider circuit of claim 1, including:

the divider circuit having a multiply mode of operation wherein the numerator value is a first multiplicand and the denominator value is a second multiplicand; wherein in the multiply mode said inverse generating circuit is responsive to an active mode signal and couples the second multiplicand to said multiplier circuit.

11. A fast divider circuit for dividing a first binary number by a second binary number, comprising:

means for normalizing the first binary value and generating a first exponent value corresponding thereto;

means for providing a normalized inverse value of the second binary value and generating a second exponent value corresponding thereto;

multiply means coupled to said normalizing means and said means for providing a normalized inverse value, for multiplying the first normalized binary value by the normalized inverse value to generate a normalized product;

first adding means coupled to said normalizing means and said means for providing a normalized inverse value, for adding the first and second exponent values to generate a shift sum; and means coupled to said multiply means and to said adding means for denormalizing the normalized binary product according to the shift sum.

12. The fast divider circuit of claim 11, including:

a high precision mode wherein said means for normalizing generates a first sequence of first partial terms, each first partial term being a portion of the first binary value;

said means for providing a normalized inverse value generates a second sequence of second partial terms, each second partial term being a portion of a normalized inverse value of the second binary number; and the first sequence and the second sequence couple different combinations of first and second partial terms to said multiplier, the products of each different combination being a partial product term.

13. The fast divider circuit of claim 12, including:

accumulate and shift means coupled to said multiply means for accumulating partial product terms to generate a normalized quotient value, and said denormalizing means is further coupled to said accumulate and shift means.

14. The fast divider circuit of claim 13, wherein:

said accumulate and shift means includes shift means coupled to said multiply means for shifting each partial product term according to the positions of first and second terms within the first binary value and inverse value of the second binary valve, second adding means coupled to the shift means for adding the shifted partial product term from the shift circuit with an accumulator term to produce an intermediate sum value, and accumulator means for accumulating intermediate sum values to generate the accumulator term.

15. A method of dividing two binary values, comprising the steps of:

normalizing at least one numerator value to create at least one first normalized numerator value and a first numerator exponent value;

generating at least one normalized denominator inverse value and a denominator inverse exponent value from a denominator value;

multiplying at least one normalized numerator value by at least one normalized denominator inverse value to generate at least one product term;

adding at least the numerator exponent value and the denominator exponent value to produce a product exponent value; and denormalizing the first product term according to the product exponent value.

16. The method of claim 15, including:

the step of generating at least one normalized inverse denominator value includes providing a normalized inverse value and corresponding inverse exponent value for a range of denominator values, and outputting the stored normalized inverse value and corresponding inverse exponent value in response to a particular denominator value.

17. The method of claim 16, including:

the step of normalizing at least one numerator value includes normalizing a first sequence of numerator values;

the step of generating at least one normalized denominator inverse value includes generating a second sequence of normalized inverse values;

the multiplying step includes multiplying normalized numerator values by normalized denominator inverse values according to the first and second sequences to generate a plurality of sequential partial product terms; and accumulating the plurality of product terms to produce a high precision absolute quotient value.

18. The method of claim 17, including:

the step of normalizing at least one numerator value includes generating an absolute numerator value and a numerator sign value; and generating a signed product term in response to the sign value.

19. The method of claim 18, wherein:

the numerator values are two's complement values, and generating an absolute numerator value includes, for negative two's complement numerator values, inverting and incrementing the numerator value.

20. The method of claim 15, including:

a multiply mode including the step of normalizing at least one numerator value creates at least one first multiplicand value;

the step of generating a normalized denominator inverse value is bypassed;

generating a second multiplicand value;

the step of multiplying includes multiplying the first multiplicand by the second multiplicand.

* * * * *